US007627424B1

(12) United States Patent
Gibbs et al.

(10) Patent No.: US 7,627,424 B1
(45) Date of Patent: Dec. 1, 2009

(54) APPARATUS AND METHOD FOR LONG TERM TRACKING FOR ASW APPLICATIONS

(75) Inventors: Robert C. Gibbs, Jamestown, RI (US); Michael J. Walsh, Somerset, MA (US); Maria C. Santos, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 715 days.

(21) Appl. No.: 11/147,650

(22) Filed: Jun. 6, 2005

(51) Int. Cl.
*G01C 21/00* (2006.01)

(52) U.S. Cl. ...................................... 701/205; 701/207

(58) Field of Classification Search ............ 340/426.13, 340/425.5, 426.19, 988, 426, 438; 342/357.06, 342/457, 450, 357.02; 455/456.1
See application file for complete search history.

(56) References Cited

U.S. PATENT DOCUMENTS

| | | | | |
|---|---|---|---|---|
| 4,494,116 | A | 1/1985 | Tagami et al. | |
| 5,065,161 | A | 11/1991 | Shibutani | |
| 5,381,140 | A | 1/1995 | Kuroda et al. | |
| 5,916,284 | A | 6/1999 | Ishihara et al. | |
| 6,909,398 | B2 * | 6/2005 | Knockeart et al. | 342/357.14 |
| 2002/0120391 | A1 | 8/2002 | Nehis | |
| 2002/0120394 | A1 * | 8/2002 | Rayne | 701/207 |
| 2004/0090864 | A1 * | 5/2004 | Larosa et al. | 367/124 |

* cited by examiner

*Primary Examiner*—Mark Hellner
*Assistant Examiner*—Helal A Algahaim
(74) *Attorney, Agent, or Firm*—James M. Kasischke; Michael P. Stanley; Jean-Paul A. Nasser

(57) ABSTRACT

An apparatus and method are disclosed that provide target motion analysis with the ability for having long-term tracking. The apparatus and method provide a leg builder program that monitors successive positional updates from a target and converts the updates into a leg format. The leg format consists primarily of start time, latitude/longitude, time on leg, and end latitude/longitude. The leg format is continuously updated so long as the course of the target is steady. The leg format further embodies routines that provide for a spherical earth model and also for handling unstable course and speed conditions from a target.

6 Claims, 5 Drawing Sheets

APPARATUS AND METHOD FOR LONG TERM TRACKING FOR ASW APPLICATIONS

STATEMENT OF GOVERNMENT INTEREST

The invention described herein may be manufactured and used by or for the government of the United States of America for governmental purposes without the payment of any royalty thereon or therefor.

BACKGROUND OF THE INVENTION (1) Field of the Invention

The invention relates to a processor and a method of operation thereof particularly suited for target motion analyzers (TMA) applications, and more specifically to an apparatus and method for determining, storing and, plotting long term tracking history of a target being tracked for anti-submarine warfare (ASW) applications.

2. Description of the Prior Art

Traditional methods of long term tracking of target onboard United States Navy submarines require manual paper and pencil plotting. A person known as a "geo-plotter" manually plots own ship and all target tracks onto a paper plot. This paper plot is typically kept for several days until the submarine moves into a new operating area or until the plot becomes too cluttered to maintain. Naval documents describe existing manual plotting techniques.

For several years electronic geographic plotting programs have been available on submarines; however, these programs have not been sufficient to replace the manual "geo-plotter." All previous electronic programs have made the assumption that the tracking period will be less than three hours, which is not always the case. These electronic programs also disadvantageously assume a flat earth model and motion through a known water model, which sometimes leads to erroneous results. These electronic programs also store data into computer memory in a way that cannot be easily expanded and, more importantly, such that it may be lost in the event of a power cycle. It is desired that an electronic program be provided that is not predicated on a flat earth model and known motion through the water, provides several days of tracking history, and utilizes a small amount of computer space whose contents is not destroyed by power cycles while still providing accurate long time plots of targets.

SUMMARY OF THE INVENTION

The practice of the present invention provides for an apparatus and method that determine, store and plot long term tracking history, sometimes covering several days and providing such an apparatus and method that do not consume a major amount of processing power and is free from destruction by power cycling, while at the same time allowing for accurate plotting.

A further object of the present invention is to provide long-term history that takes into account a spherical earth model.

It is an additional object of the present invention to provide for an apparatus and method for plotting long term history of targets and handling such targets having unstable course and speed conditions.

A method is provided for long term tracking of a target and comprises the steps of monitoring and reading, converting and updating. The method (a) monitors and reads first and second positional updates of a target, each of the positional updates comprising latitude and longitude quantities (b) converts the first and second positional updates into a first leg format comprising: $b_1$ start time of the second positional update; and $b_2$ interconnected latitude and longitude quantities of each of the first and second positional updates. The method also includes updating the first leg with associated interconnected latitude and longitude quantities when a third positional update occurs, which represents a move that exceeds a predetermined distance from the second update, while at the same time the update ensures the first, second, and third positional updates represent that a steady coarse is being pursued by the target. The method repeats the monitoring and reading, converting and updating steps for subsequent positional updates.

DESCRIPTION OF THE DRAWINGS

The claims particularly point out and distinctly claim the subject matter of this invention. The various objects, advantages and novel features of this invention will be more fully apparent from the reading of the following detailed description in conjunction with the accompanying drawings in which like reference numbers refer to like parts and in which:

DESCRIPTION OF THE PREFERRED EMBODIMENTS

Figure 1:
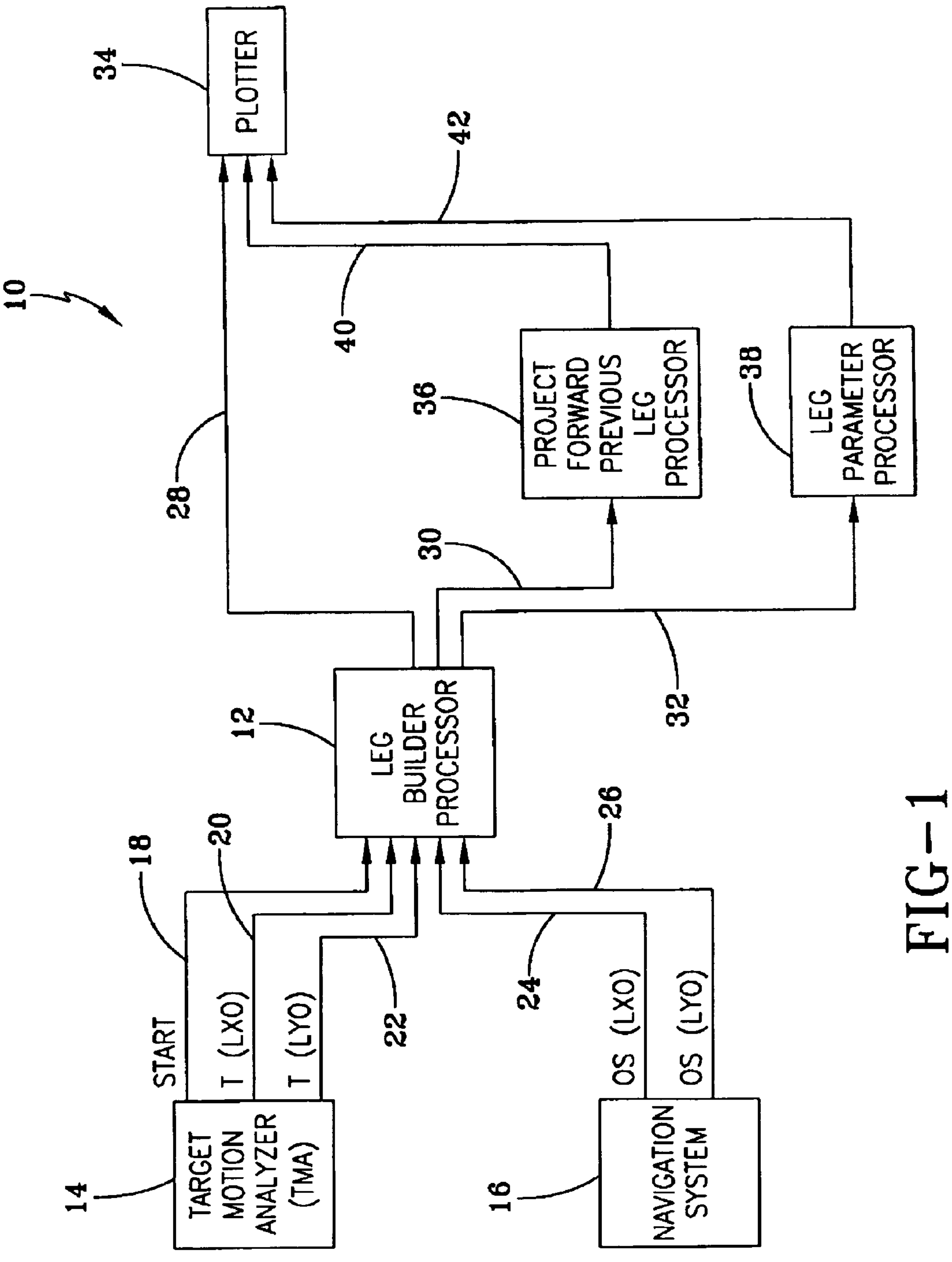
FIG. 1 is a block diagram of the present invention.

With reference to FIG. 1, there is shown a system 10 that provides for long term tracking of a target for target motion analysis (TMA) applications. The system 10 primarily comprises a leg builder processor 12 that receives inputs from a target motion analyzer 14 and from a navigational system 16.

The target motion analyzer (TMA) 14, known in the art, routes signals START, target (T) latitude (LXO) and target (T) longitude (LYO) information respectively on signal paths 18, 20 and 22 to the leg builder processor 12. The navigational system 16, known in the art, routes, to the leg builder processor 12, own ship (OS) latitude (LXO) and own ship (OS) longitude (LYO) via signal paths 24 and 26.

The leg builder processor 12 is comprised of multiple subprocessors and preferably provides three sources of information respectively on signal paths 28, 30 and 32 which, in turn, are respectively routed to a plotter 34, a project forward previous leg processor 36 and a leg parameter processor 38, both processors 36 and 38 to be further described hereinafter. The plotter 34 also receives output signals on signal path 40 from the project forward previous leg processor 36 and output signals on signal path 42 from the leg parameter processor 38.

The leg builder processor 12 operates by monitoring successive positional updates, each comprised of T (LXO) and T (LYO) quantities from TMA 14 and converting these positional updates into a leg format. The leg format consists primarily of a start time, latitude/longitude, time on leg, and end latitude/longitude. By using a leg format the amount of hard drive space and the computer CPU cycles allocated to the leg builder processor 12 and used to plot the data are significantly reduced over prior art electronic methods for storing and plotting every successive update point. The leg format is stored to computer hard drive in two files per target contact. The current leg, to be further described hereinafter, being handled by the leg builder processor 12 is stored in one file and is continually updated as long as the course being pursued by the target is steady. All historical legs derived by the leg builder processor 12 are stored in the second file. The historical leg file is only updated periodically with the current leg being handled by the leg builder processor 12, whenever a new leg is determined by the operation of the leg builder processor 12, to be described hereinafter.

In general, the leg builder processor 12, (a) monitors and reads the first and second positional updates for the target, (b) converts the first and second positional updates into a leg format comprising: ($b_1$) start time of the second positional update; and ($b_2$) interconnected latitude and longitude quantities of each of the first and second updates. The leg and builder processor (c) updates the first leg when a third positional update occurs, which represents a move that exceeds a predetermined distance, e.g., 150 yards, from the second update, while at the same time the update ensures that the first, second and third positional updates represent that a steady course is being pursued by the target. The leg builder processor continues by repeating steps a, b, and c for subsequent positional updates.

Figure 2A:
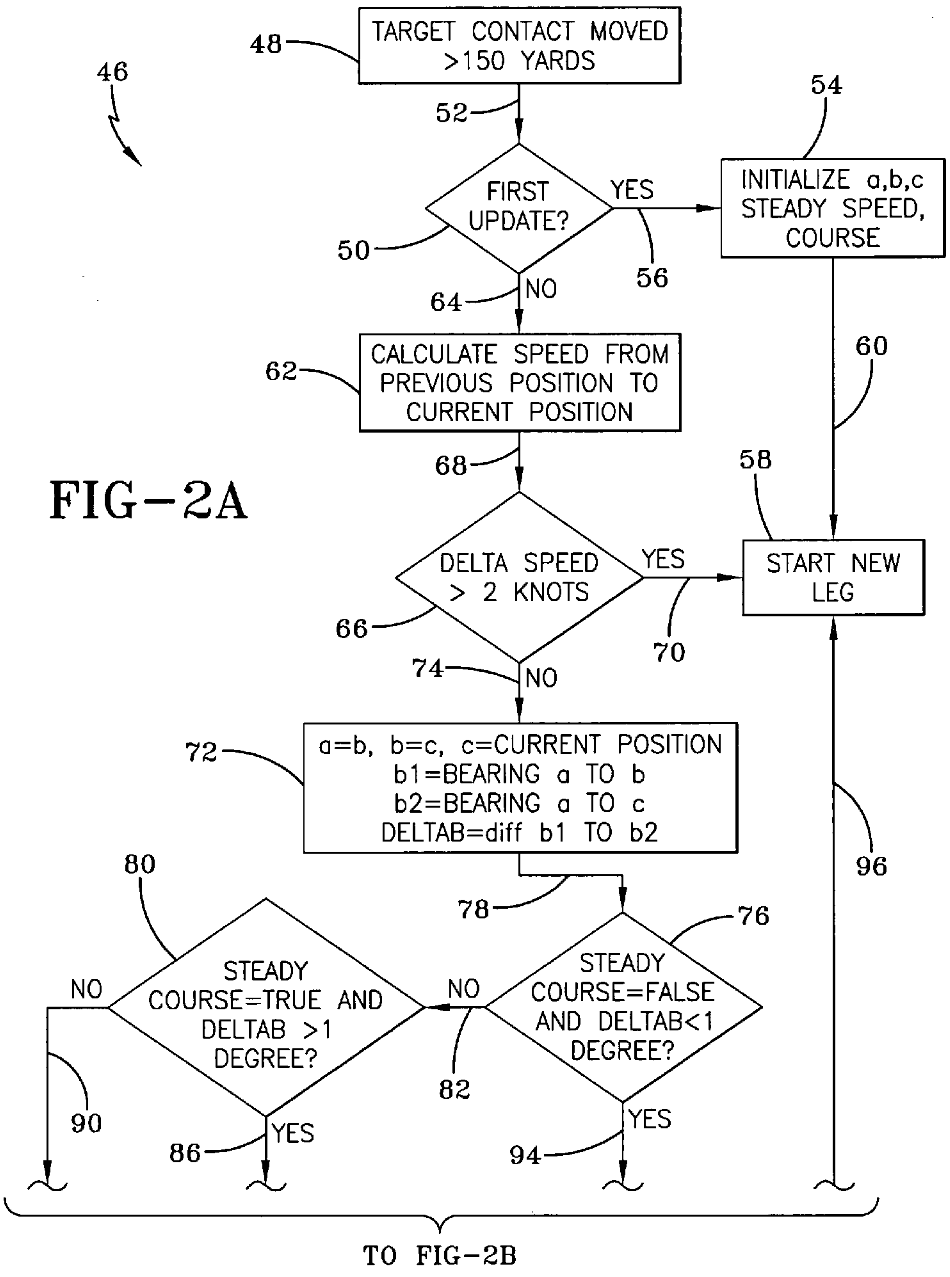
FIG. 2 is composed of FIGS. 2A and 2B that cumulatively illustrate a flow chart for the leg builder processor of the invention.
Figure 2B:
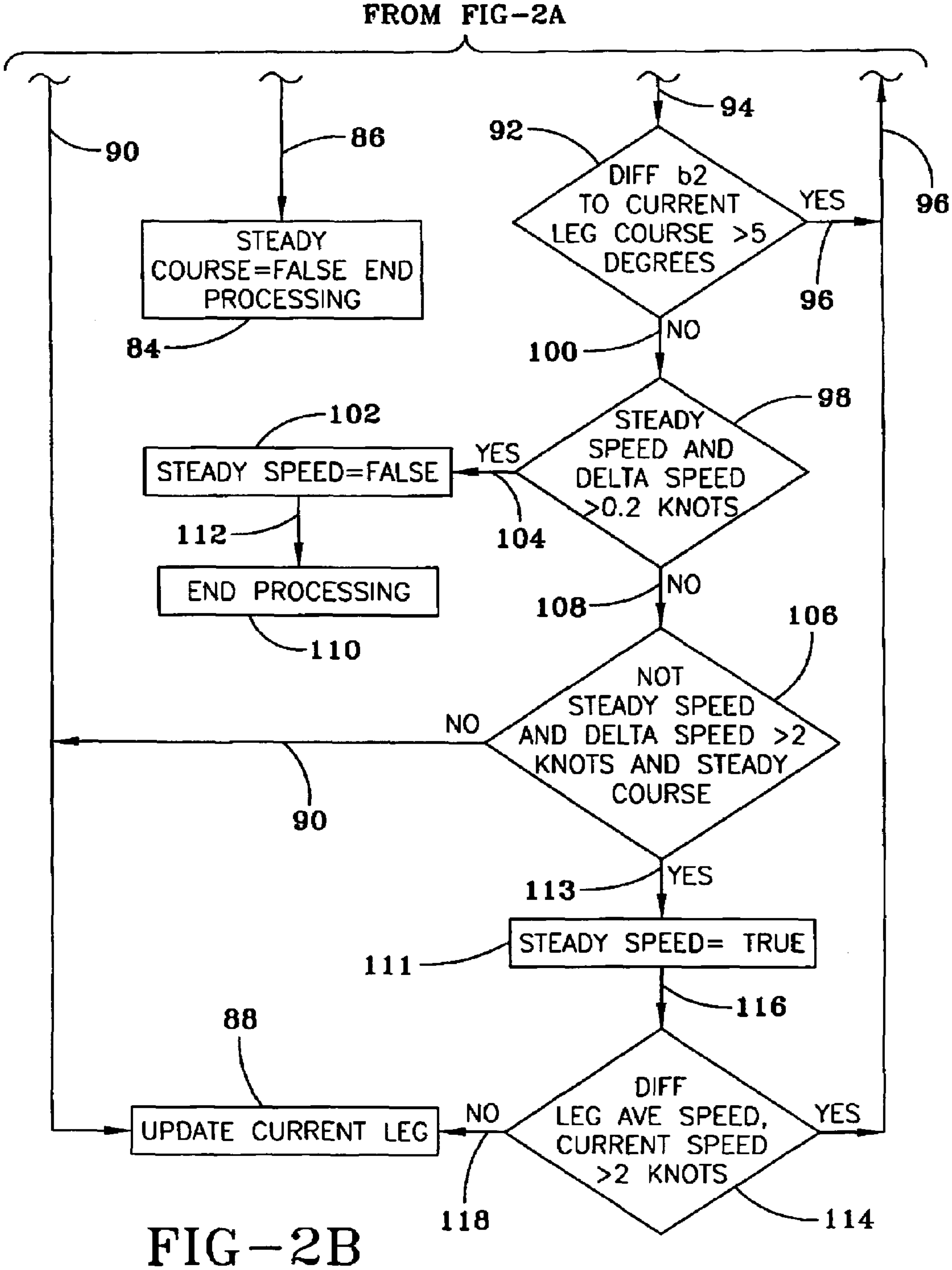

The leg builder processor 12 determines new legs by watching the system solution for own ship and all target contacts. When a solution is first received, indicated bythe presence of the START signal of signal path 18, the leg builder processor 12 records the target latitude and longitude (T) (LXO) and (T) (LYO) respectively, as well as other information, to be described hereinafter, and marks the occurrence of START as the "start point" for the current leg. The operation of the leg builder processor 12 may be further described with reference to the flow diagram of FIG. 2 composed of FIGS. 2A and 2B that cumulatively illustrate the overall program 46 comprised of a plurality of program segments, the first of which is program segment 48 shown in FIG. 2A.

Program segment 48 indicates the initiation of the operation of the leg builder processor 12. More particularly, program segment 48 indicates the detection that the target contact has moved a first predetermined distance of e.g., at least 150 yards and upon the detection, passes control to program segment 50 by way of signal path 52.

Program segment 50 determines if this is the first update being serviced by the overall program 46 and if the answer is yes, program segment 50 passes control to program segment 54 by way of signal path 56.

Program segment 54 initiates the quantities a, b, and c all related to determining if a steady speed and steady course are being pursued by the target. Upon completion, program segment 54 passes control to program segment 58 by way of signal path 60. Program segment 58 starts the formation of a new or first leg.

In answer to program segment 50 was no in that the output of program segment 48 was not the first update being serviced by the overall program 46, then program segment 50 passes control to program segment 62, by way of signal path 64. Program segment 62 calculates the speed from the previous positional update to the current positional update and passes control to program segment 66 by way of signal path 68.

Program segment 66 determines if the speed parameters from any previous update to any update presently being handled by program segment 66 do not differ from each other by more than two (2) knots. If the answer is yes, program segment 66 passes control to program segment 58, by way of signal path 70. Program segment 58 then starts a new leg. If the answer to program segment 66 is no, program segment 66 passes control to program segment 72, by way of signal path 74.

Program segment 72, and the program segments to be described following it, take into account the bearing between the first update, identified by the quantity a, and the second update, identified by the quantity b, as well as the bearing between the first update (a) and the third update, identified by the quantity c. Further, Program 72, and the program segments to be described following it, take into steady and non-steady speeds of the target. The initial conditions for program segment 76 are shown as a=b, b=c, c=current conditions, b1=bearing a to b, b2=bearing a to c, and delta=diff b1 to b2. Program segment 72 and the program segments following it, ensure that if the course from a to b and the course from a to c differ by at least 1 degree, then the leg builder processor 12 unsets the steady course flag (program segment 84 to be described hereinafter) and stops updating the current leg. If the steady course flag is set and the course from a to b and the course from a to c differ by less than 1 degree, the leg builder processor 12 updates the end point (program segment 88 to be described hereinafter) of the leg being formed. Program segment 72 preferably uses a rhumb line calculation, known in the art, to determine the a to b and b to c courses. Program segment 72 passes control to program segment 76 (shown on FIG. 2B) by way of signal path 78.

Program segment 76 determines that the steady course of the target is false or true and if the delta between bearings b1 and b2 is less than one (1) degree. If the steady course is true, and if delta is less than one (1) degree, then program segment 76 passes control to program segment 80, by way of signal path 82.

Program segment 80 also determines the steady course is true and the delta between bearings b1 and b2 is less than 1 degree and if the answer is yes, program segment 80 passes control to program segment 84, by way of signal path 86.

Program segment 84 determines that the steady course is not being followed and ends the processing being performed by overall program 46, which waits for the occurrence of program segment 48.

Program segment 80 upon determination that the steady speed course is being followed, passes control to program segment 88, by way of signal path 90. Program segment 88 updates the current leg that is, the end point of the current leg.

If program segment 76 determines that a steady course is not being followed and the delta between b1 and b2 is less than one (1) degree, program segment 76 passes control to program segment 92, by way of signal path 94.

Program segment 92 determines if the delta between b1 and the current bearing is greater than 5 degrees and if the answer is yes, then program segment 92 passes control to program segment 58, by way of signal path 96.

If the program segment 92 determines that the difference between b1 and the current bearing being followed is less than five (5) degrees, then program segment 92 passes control to program segment 98 by way of signal path 100.

Program segment 98 examines the steady speed and the delta speed between the three positions; a, b and c, and if the difference between the steady speed and delta speed is greater than 0.2 knots, then program segment 98 passes control to program segment 102, via signal path 104; however, if the difference between the steady speed and delta speed is less than 0.2 knots, then program segment 98 passes control to program segment 106 by way of signal path 108.

Program segment 102 verifies that the steady speed is false and passes control to program segment 110, by way of signal path 112. Program segment 110 ends the processing being performed by the overall program 46, which awaits for the occurrence of program segment 48.

Program segment 106 determines if the speed is not steady and if the delta speed exceeds a certain value, such as 2 knots, and if the course is steady. If the course is not steady, and if the answer to the other inquiries is no, then program segment 106 passes control to program segment 88, by way of signal path 90. If the answer to all inquiries is yes, then program segment 106 passes control to program segment 111, by way of signal path 113.

Program segment 110 determines if the steady speed is true, and then program segment 110 passes control to program segment 114, by way of signal path 116.

Program segment 114 determines that the difference between the leg average speed and current speed is greater than 2 knots, and if the answer is no, then program segment 114 passes control to program segment 88, by way of signal path 118. If however, if the answer to program segment 114 is yes, then program segment 114 passes control to program segment 58 by way of signal path 96.

It should now be appreciated that when a solution is first received, indicated by the presence of the START signal on signal path 18, the leg builder processor 12 records the associated latitude and longitude of the target, as well as other information, and marks the occurrence of the START signal as the "start point" for the current leg of the long-term tracking being provided. After the leg builder processor 12 starts a leg, the leg builder processor 12 receives updates from the tactical database whenever the contacted target moves at least 150 yards. The leg builder processor 12 keeps the last three updates from the target contact and labels them a, b, and C. If the course from a-b and the course from a-c differ by at least 1 degree, then the leg builder processor 12 unsets the steady course flag generated by program segment 84 and stops updating the current leg. If the steady course is set and the course from a to b and the course from b to c differ by less than one degree, the leg builder processor 12 updates the endpoint generated by program segment 88 of the current leg. If the steady course is not set, then the leg builder processor 12 makes no further updates until the a to b course vs. the a to c course steadies up (i.e., the difference is less than 1 degree as determined by program segment 76). When the course steadies up, the leg builder processor 12 sets the steady course flag and then program segment 92 looks at the overall course change to determine if a new leg should be created. If the course change is less than 5 degrees, the leg builder processor 12 continues, as determined by program segment 92, to update the current leg. If the course change is greater than 5 degrees, the leg builder processor 12, more particularly program segment 92, establishes the old current leg as a history leg and creates a new current leg. A rhumb line calculation, preferably accomplished by program segment 72, is used to determine the a to b and a to c course. The leg builder processor 12, in particular program segment 66, will also trigger a new leg on a speed change of at least 2 knots. The leg builder processor 12 may be further described with reference back to FIG. 1.

As seen in FIG. 1, the leg builder processor 12 provides additional processing by way of associated project forward previous leg processor 36. The project forward previous leg processor 36 comprises routines, known in the art, so as to project forward previous legs, such that all previous legs are connected to one another and also to the current leg so as to be plotted on a geographic plot by plotter 34. This processing handles the case where connecting legs would not be feasible due to positional changes resulting from new assumptions in the TMA solution, resetting the ship's inertial navigation system, or shutting down the leg builder processor 12 for a period of time.

As further seen in FIG. 1, the leg builder processor 12 also provides additional processing for each leg by way of associated leg parameter processor 38 comprised of routines, known in the art, as well as a routine that treats the target's plot based on a spherical earth. More particularly, for every leg, additional information including minimum, maximum, and average speed, set, drift, and depth, starting course, and course made good (known in the art) are provided by leg parameter processor 38. Table 1 below shows an example of the output of the leg parameter processor 38 when plotted as a geographic plot by plotter 34.

TABLE 1

| Ownship: Leg History | |
|---|---|
| Course Made Good: | 0-45 degs |
| Length: | 1 yd |
| Speed: | |
| Min: | 5.0 kts |
| Max: | 5.0 kts |
| Ave: | 5.0 kts |
| Depth: | |
| Min: | 100.0 ft. |
| Max: | 100.0 ft |
| Ave: | 100.0 ft |
| Set/Drift: | |
| Min Set: | 236.4 degs |
| Max Set: | 236.4 degs |
| Ave Set: | 236.4 degs |
| Min Drift: | 4.2 kts |
| Max Drift: | 4.2 kts |
| Ave Drift: | 4.2 kts |
| Elapsed Time: | 00:10:04 |

The plots provided by the processors of the present invention may be further described with reference to FIGS. 3 and 4.

Figure 3:
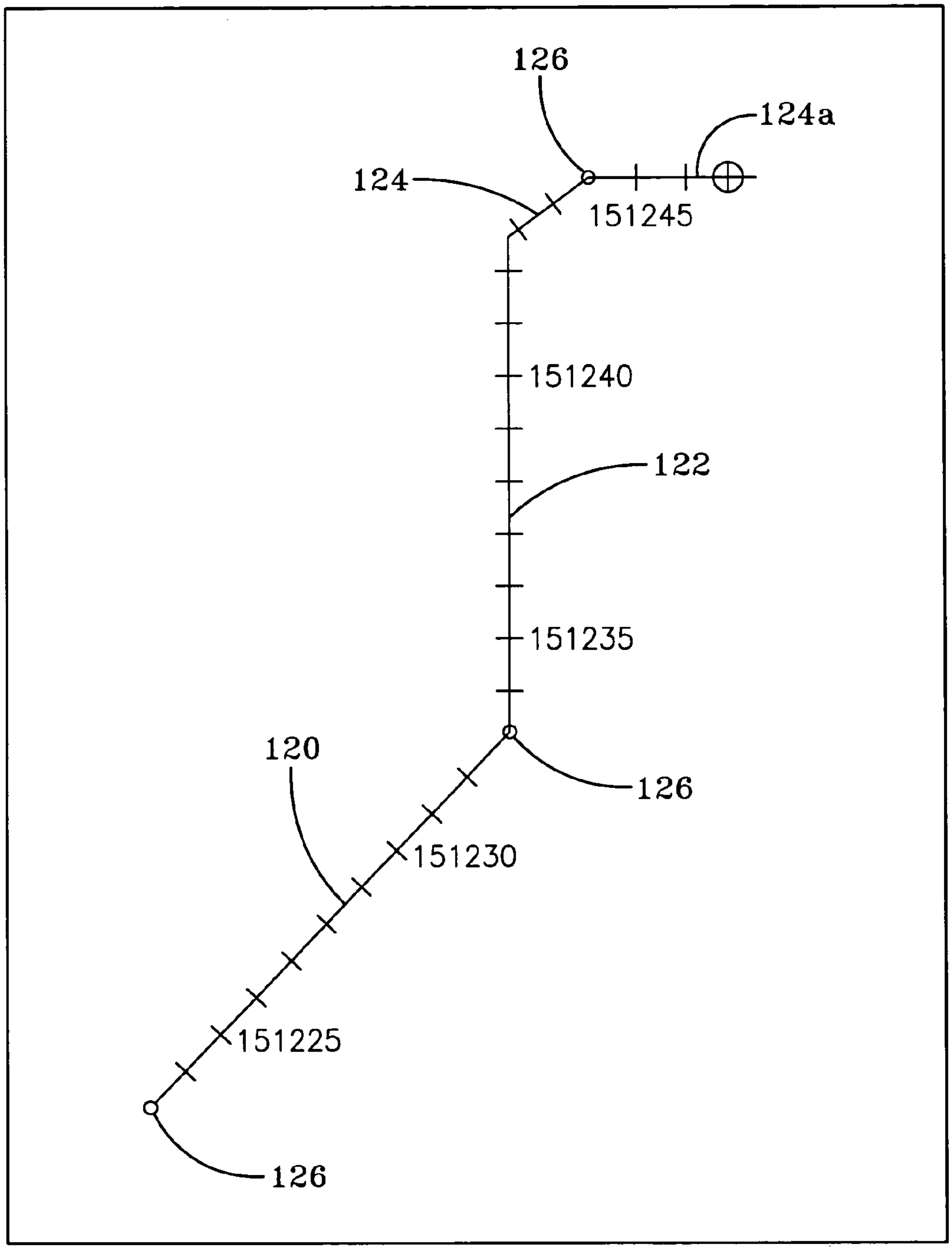
FIG. 3 illustrates an example of leg history being plotted in a geographic plot.

FIG. 3 illustrates plots 120, 122 and 124. The plots 120 and 122 represent two historical legs and plot 124*a* represents a current leg. FIG. 3 also illustrates open circles 126 that are indicative of the start of legs 120, and 122. The dash marks shown on FIG. 3 leg 124 indicates discontinuing between leg 122 and leg 124*a*.

Figure 4:
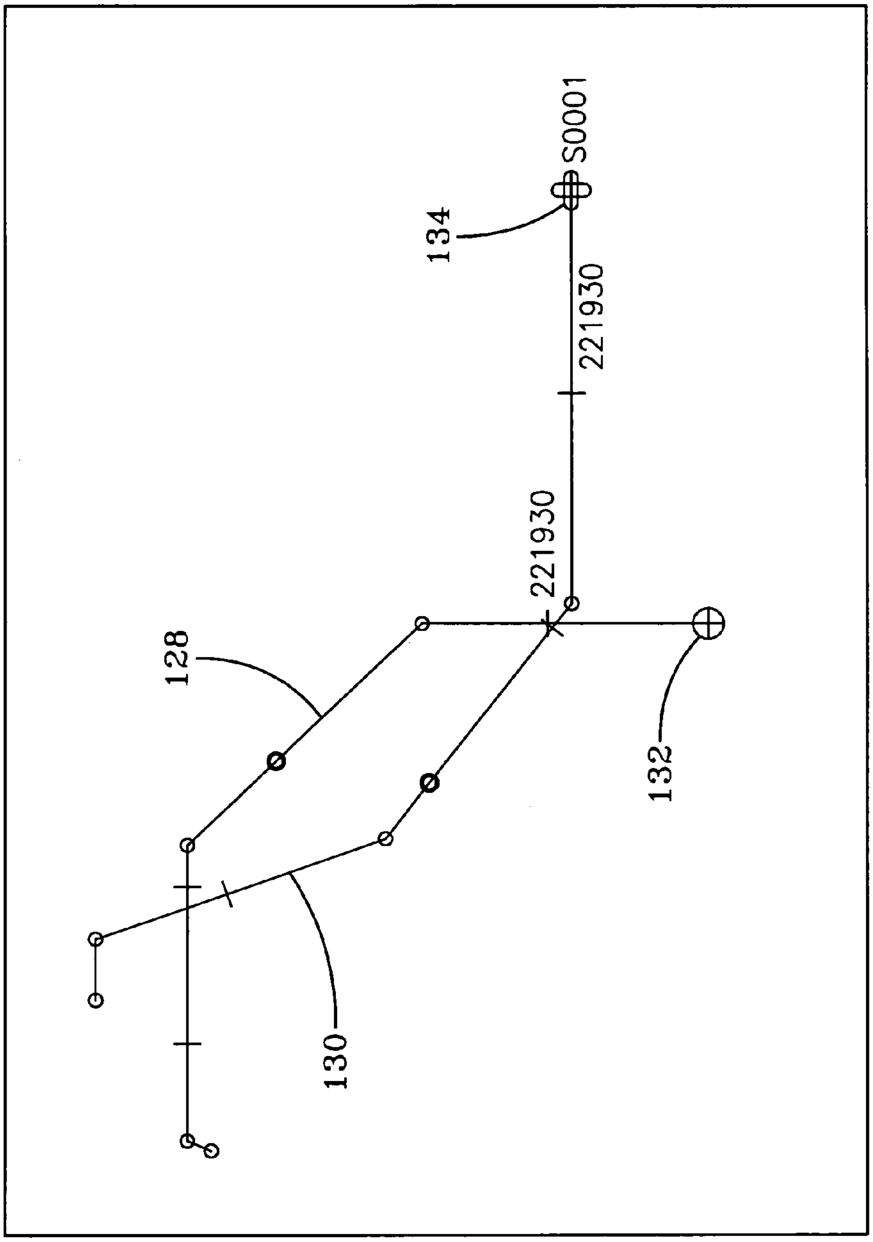
FIG. 4 illustrates another example of leg history related to own ship and target information.

As seen in FIG. 4, the own ships position is given by plots 128, whereas the target position plot is given by plot 130. The own ship position now function is indicated by reference number 132, whereas target position now function is indicated by reference number 134.

It can now be appreciated that the present invention provides for geographic parts that are used in situations that allows the operator to click on a leg history so as to view the identity of the track plot being used and to identify that track.

It will be understood that various changes and details, steps and arrangements and parts and methods, which have been described an illustrated in order to explain the nature of the invention, may be made with those skilled in the art within the principle and scope of the invention as expressed in the amended claims.

What is claimed is:

1. A target tracking and plotting method for a target, said method being provided for use in a computerized system, comprising:

identifying the target with initial coordinates and an initial time;

obtaining second coordinates for the identified target at a second time;

building a leg from the initial coordinates, initial time, second coordinates and second time if said initial coordinates are a threshold distance away from said second coordinates;

recording the built leg;

obtaining current coordinates for the identified target at a current time if said current coordinates are the threshold distance away from said second coordinates;

determining if the target is maintaining a steady speed;

determining if the target is maintaining a steady course;

entering the current coordinates for the identified target as an addition to the built leg if the target is maintaining a steady speed and a steady course;

recording the addition to the built leg;

restarting said step of identifying the target with said current coordinates and current time when the target is not maintaining a steady speed;

restarting said step of identifying the target with said current coordinates and current time when the target is not maintaining a steady course; and providing plots of any selected recorded legs when a demand is received.

2. The method of claim 1 wherein said step of determining if the target is maintaining a steady course comprises:

computing a first course from said initial coordinates and said second coordinates;

computing a current course from said initial coordinates and said current coordinates;

calculating a course difference between said first course and said current course; and comparing said course difference against a course difference threshold, said target maintaining a steady course if said course difference is within said course difference threshold, and said target not maintaining a steady course if said course difference exceeds said course difference threshold.

3. The method of claim 2 wherein said step of determining if the target is maintaining a steady course utilizes a rhumb line calculation for said steps of computing a first course, computing a current course and calculating a course difference.

4. The method of claim 1 wherein said step of determining if the target is maintaining a steady speed comprises:

computing a first speed from said initial coordinates, said second coordinates, initial time and second time;

computing a current speed from said initial coordinates, said current coordinates, said initial time and said current time;

calculating a speed difference between said first speed and said current speed; and comparing said speed difference against a speed difference threshold, said target maintaining a steady speed if said speed difference is within said speed difference threshold, and said target not maintaining a speed course if said speed difference exceeds said speed difference threshold.

5. The method of claim 1 further comprising the step of linking recorded legs to provide a contiguous target track.

6. The method of claim 1 further comprising the steps of:

obtaining own ship coordinates and associated times;

recording own ship coordinates and associated times; and providing plots of said own ship position while providing plots of any selected legs.

* * * * *